(12) United States Patent
Varda

(10) Patent No.: US 8,899,266 B2
(45) Date of Patent: Dec. 2, 2014

(54) FLUID DISPLACEMENT RESERVOIR

(75) Inventor: David J. Varda, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1427 days.

(21) Appl. No.: 11/674,708

(22) Filed: Feb. 14, 2007

(65) Prior Publication Data

US 2008/0190497 A1 Aug. 14, 2008

(51) Int. Cl.
*F16H 57/12* (2006.01)
*F15B 1/26* (2006.01)
*F16H 57/04* (2010.01)

(52) U.S. Cl.
CPC ............... *F15B 1/26* (2013.01); *F16H 57/0452* (2013.01); *F16H 57/0443* (2013.01); *F16H 57/0404* (2013.01)
USPC ........... 137/574; 137/576; 137/582; 137/587; 137/590

(58) Field of Classification Search
USPC .......................... 137/574, 576, 582, 587, 590
See application file for complete search history.

(56) References Cited

U.S. PATENT DOCUMENTS

| | | | |
|---|---|---|---|
| 4,354,521 A * | 10/1982 | Harde | 137/571 |
| 4,397,333 A * | 8/1983 | Liba et al. | 137/574 |
| 4,424,829 A * | 1/1984 | Millington et al. | 137/590 |
| 4,616,609 A * | 10/1986 | Munch et al. | 123/196 AB |
| 4,669,501 A * | 6/1987 | Takahashi | 137/576 |
| 4,938,184 A * | 7/1990 | Martin et al. | 123/195 C |
| 5,014,819 A | 5/1991 | Gotou et al. | |
| 5,680,833 A * | 10/1997 | Smith | 123/41.54 |
| 6,640,767 B2 * | 11/2003 | Kato et al. | 123/195 C |
| 6,845,743 B1 * | 1/2005 | Bishop | 123/195 C |
| 6,913,040 B2 * | 7/2005 | Crossman et al. | 137/587 |

FOREIGN PATENT DOCUMENTS

DE 41 08 657 A1 9/1992

* cited by examiner

*Primary Examiner* — William McCalister
(74) *Attorney, Agent, or Firm* — Quinn Law Group, PLLC

(57) ABSTRACT

A transmission is provided including a sump at least partially defining a sump volume and operable to contain a fluid. The transmission further includes a hydraulic pump. An inlet tube is disposed at least partially within the fluid and is operable to communicate the fluid from the sump volume to the hydraulic pump. A fluid displacement reservoir defining a reservoir volume and disposed at least partially within the sump volume is also provided. The fluid displacement reservoir is operable to selectively displace or impede the movement of at least a portion of the fluid when the fluid within the transmission is subject to acceleration, such that the amount of the fluid required within the sump volume to maintain the inlet tube disposed within the fluid is reduced. The fluid displacement reservoir is also operable to selectively contain or receive at least a portion of the fluid.

7 Claims, 3 Drawing Sheets

FLUID DISPLACEMENT RESERVOIR

TECHNICAL FIELD

The present invention relates to a fluid displacement reservoir disposed with respect to a sump of a transmission.

BACKGROUND OF THE INVENTION

Automatically shiftable transmissions require a supply of pressurized oil or fluid to operate. The pressurized fluid may be used for such functions as lubrication, torque converter operation, and engagement of torque transmitting mechanisms for gear ratio interchange. The fluid is typically stored in a main reservoir or main sump volume where it is introduced to a pickup or inlet tube for communication to a hydraulic pump. The hydraulic pump operates to pressurize the fluid for subsequent communication to components within the transmission. Therefore, the inlet tube must remain submerged in fluid during the operation of the transmission to avoid starvation of the hydraulic pump. To this end, an adequate fluid level or volume is typically maintained within the main sump volume of the transmission during cold operation. At higher fluid temperatures, the fluid tends to expand and entrain an amount of air such that the volume of fluid within the main sump volume may increase significantly.

At cold operating temperatures, an amount of fluid must be provided within the sump volume to provide the inlet tube with an uninterrupted flow of fluid during vehicular maneuvers, such as cornering and hard acceleration. This amount of fluid, referred to as the maneuver volume, is typically much greater than that which is required for steady state vehicular operation. To reduce the maneuver volume required during cold operation, while providing an uninterrupted flow of fluid to the inlet tube, engineers have developed dry sump systems, baffle systems, and sliding inlet tubes to name a few.

SUMMARY OF THE INVENTION

An automatically shiftable vehicular transmission is provided having a sump at least partially defining a sump volume configured to contain a fluid. The automatically shiftable vehicular transmission further includes a hydraulic pump. An inlet tube is at least partially disposed within the fluid and is operable to communicate the fluid from the sump volume to the hydraulic pump. A fluid displacement reservoir, formed from metal or plastic, defines a reservoir volume and is disposed at least partially within the sump volume. The fluid displacement reservoir is operable to displace at least a portion of the fluid when the fluid within the transmission is cool and subject to acceleration, such that the amount of the fluid required within the sump volume to maintain the inlet tube at least partially disposed within the fluid is reduced. The fluid displacement reservoir is preferably configured to contain at least a portion of the fluid when the fluid within the sump volume is warm. The fluid displacement reservoir defines a port which is positioned substantially adjacent to the inlet tube and sufficiently configured to allow the fluid to flow into the reservoir volume when the fluid is warm. Additionally, the fluid displacement reservoir defines a vent port which is operable to facilitate flow of the fluid through the port. At least a portion of the fluid displacement reservoir may be contoured to direct the fluid toward the inlet tube when the fluid is subject to acceleration.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
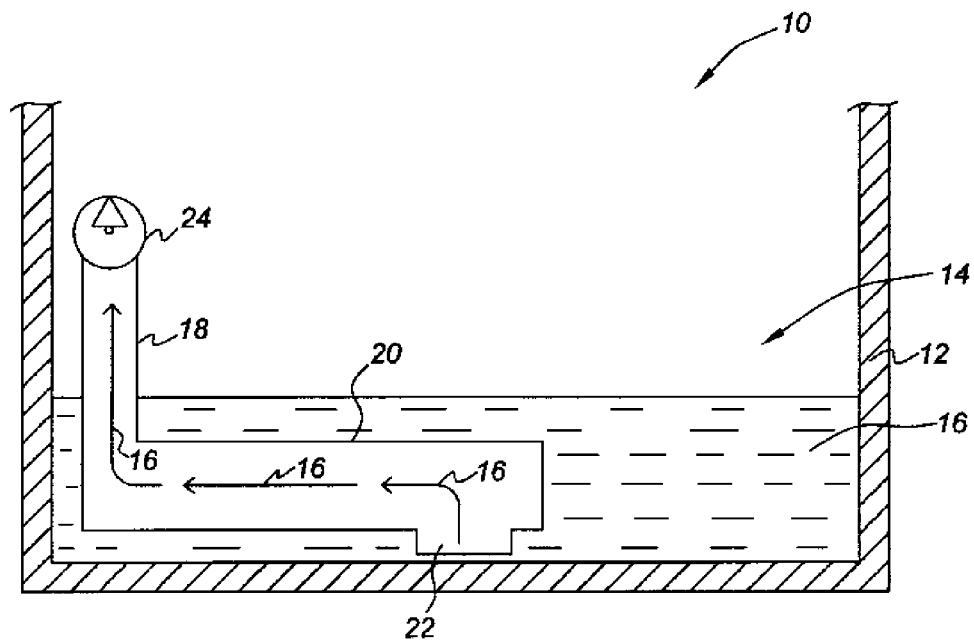
FIG. 1 is a schematic side view of a portion of a prior art vehicular transmission illustrating a sump defining a sump volume containing fluid subject to zero acceleration.

Referring to the drawings wherein like reference numbers correspond to like or similar components throughout the several views, there is shown in FIG. 1 a schematic depiction of a portion of a prior art transmission, such as an automatically shiftable vehicular transmission, generally indicated at 10. The transmission 10 includes a sump 12 at least partially defining a sump volume 14. The sump volume 14 is configured to contain an amount of fluid 16 for the operation of the transmission 10. A pick-up or inlet tube 18 is disposed within the sump volume 14 and is at least partially submerged within the fluid 16. The inlet tube 18 includes a filter portion 20 and an inlet portion 22.

A hydraulic pump 24, such as a positive displacement pump, provides pressurized fluid 16 to effect operation of the transmission 10. The inlet tube 18 is operatively connected to the hydraulic pump 24 and operates to communicate fluid 16 to the hydraulic pump 24 for subsequent pressurization and delivery to components within the transmission 10. The fluid 16 is drawn from the sump volume 14 through the inlet portion 22 and is subsequently filtered by the filter portion 20 to remove particulate matter prior to introduction to the hydraulic pump 24. Preferably, during operation of the transmission 10, the inlet portion 22 of the inlet tube 18 will remain submerged within the fluid 16 to avoid starvation of the hydraulic pump 24. Should the inlet portion 22 of the inlet tube 18 become uncovered, air may become entrained within the fluid 16 and subsequently communicated to the hydraulic pump 24, which may lead to unsatisfactory operation and/or damage to the transmission 10. Therefore, the amount of fluid 16 contained within the sump volume 14 of the transmission 10 must be carefully regulated to avoid starvation of the hydraulic pump 24.

In operation of the transmission 10 with cool fluid 16, such as initial operation of the vehicle, the amount of fluid 16 contained within the sump volume 14 is at a minimum. This is due to the fact that the fluid 16 tends to contract when cooled. Additionally, there is a large amount of fluid 16 "in transit", that is, there is a large volume of fluid 16 utilized elsewhere within the transmission 10 to effect operation thereof. Furthermore, the amount of fluid 16 required within the sump volume 14 is affected by the acceleration of the transmission 10, such as when the so-equipped vehicle accelerates, decelerates, and/or corners. Such a condition is illustrated in FIG. 2.

Figure 2:
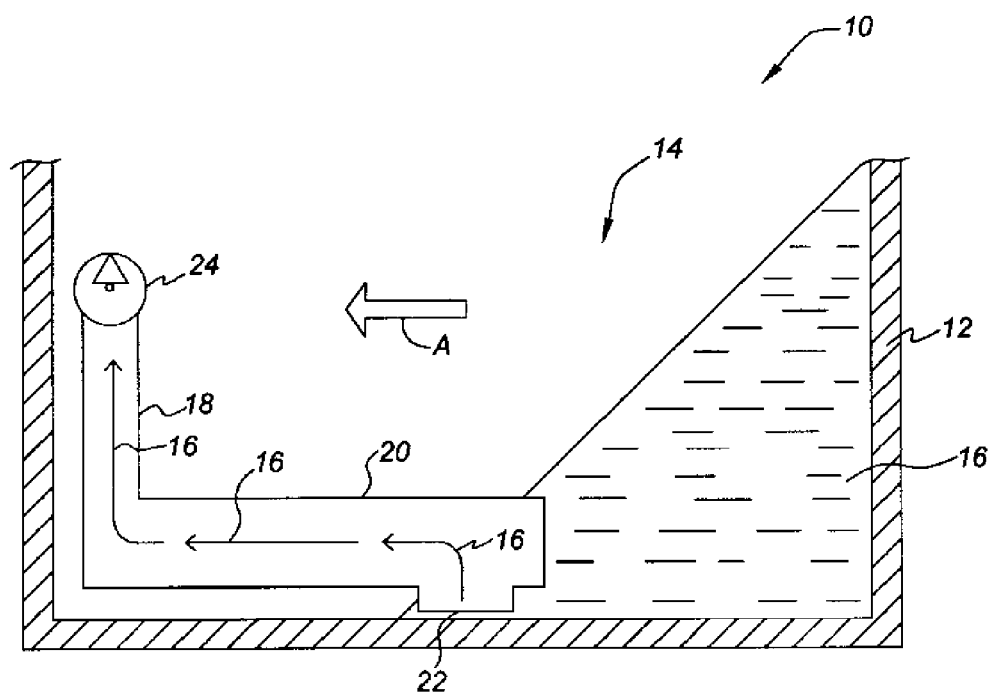
FIG. 2 is a schematic side view of the portion of the prior art vehicular transmission of FIG. 1 illustrating the sump containing fluid subject to acceleration.

Referring to FIG. 2, there is shown the prior art transmission 10 of FIG. 1, subject to acceleration in a direction indicated by arrow A (i.e. to the left as viewed in FIG. 2). As the sump 12 of transmission 10 is accelerated the fluid 16 contained therein is forced to the right, as viewed in FIG. 2. The amount of fluid 16 contained in the sump volume 14 must be sufficient to avoid starvation of the hydraulic pump 24 under such accelerations. As a result of movement or sloshing of the fluid 16 within the sump volume 14, the amount of fluid 16 required to avoid starvation of the hydraulic pump 24 during acceleration of the transmission 10 is greater than that which is required when the transmission 10 is subject to little or no acceleration. This amount of fluid 16 may be referred to as the "maneuver volume".

Figure 3:
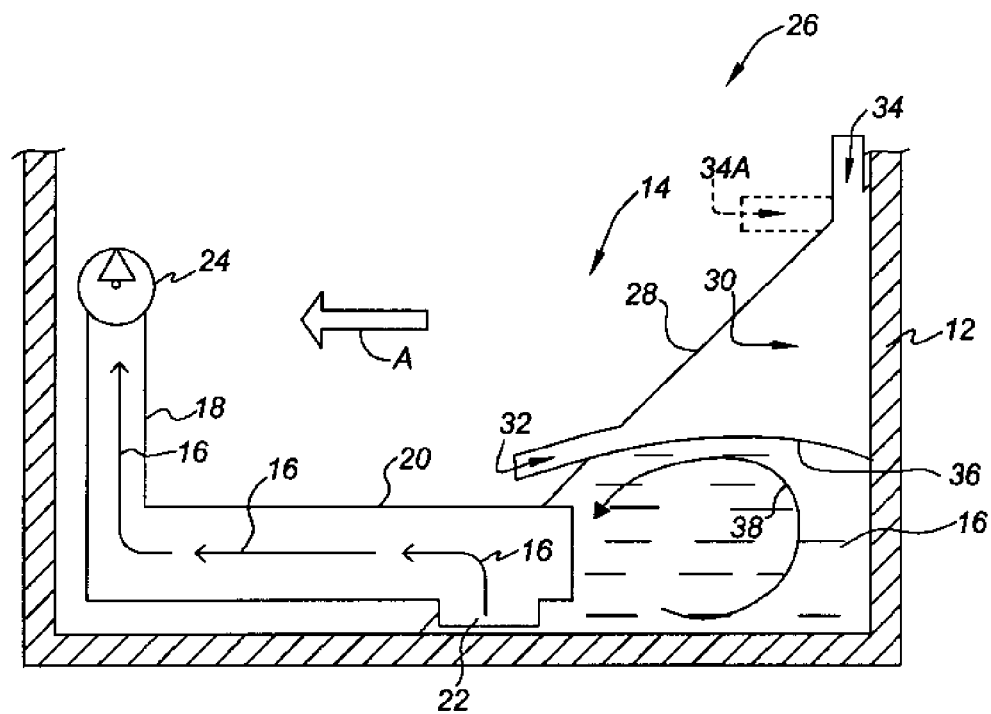
FIG. 3 is a schematic side view of a portion of a vehicular transmission of the present invention illustrating a sump defining a sump volume having a fluid displacement reservoir contained therein and a fluid subject to acceleration.

Referring to FIG. 3, there is shown an automatically shiftable vehicular transmission of the present invention, generally indicated at 26. The transmission 26 includes a fluid displacement reservoir 28 disposed at least partially within the sump volume 14. The fluid displacement reservoir 28 is preferably formed from plastic or metal; however those skilled in the art will recognize other materials, such as composite materials, which may be used to form the fluid displacement reservoir 28 while remaining within the scope of that which is claimed. The fluid displacement reservoir 28 defines a reservoir volume 30. The fluid displacement reservoir 28 further defines an orifice 32 and a vent orifice 34. The orifice 32 is preferably positioned near or adjacent to the inlet portion 22 of the inlet tube 18. The orifice 32 is configured to allow the inflow and outflow of fluid 16, while the vent orifice 34 is positioned to facilitate the inflow and outflow of fluid 16 from the orifice 32. The vent orifice 34 is preferably oriented such that fluid 16 is prevented from entering the reservoir volume 30 through the vent orifice 34. Therefore alternate orientations of the vent orifice 34 may be considered such as vent orifice 34A, which is illustrated in FIG. 3 with dashed lines.

As with the transmission 10 of FIG. 2, the transmission 26, as illustrated in FIG. 3, is subject to acceleration in the direction of arrow A. As such, the fluid 16 is forced rightward, as viewed in FIG. 3. However, the fluid displacement reservoir 28 operates to displace or impede an amount of fluid 16 during acceleration of the transmission 26. Therefore, the maneuver volume of fluid 16 required by the transmission 26 is less than that required by the transmission 10 since the fluid displacement reservoir 28 substantially blocks or prevents the fluid 16 from occupying the volume within the sump 12 where the fluid displacement reservoir 28 is disposed. The inlet orifice 32 is preferably positioned to prevent the entrance of fluid 16 into the reservoir volume 30 during acceleration of the transmission 26. By positioning the orifice 32 adjacent to the inlet portion 22 of the inlet tube 18, any fluid 16 contained within the reservoir volume 30 will drain to the general area of the inlet portion 22 of the inlet tube 18 for subsequent introduction to the hydraulic pump 24. A portion 36 of the fluid displacement reservoir 28 may be contoured to form a baffle operable to direct the fluid 16 toward the inlet portion 22 of the inlet tube 18 as illustrated by arrow 38.

Figure 4:
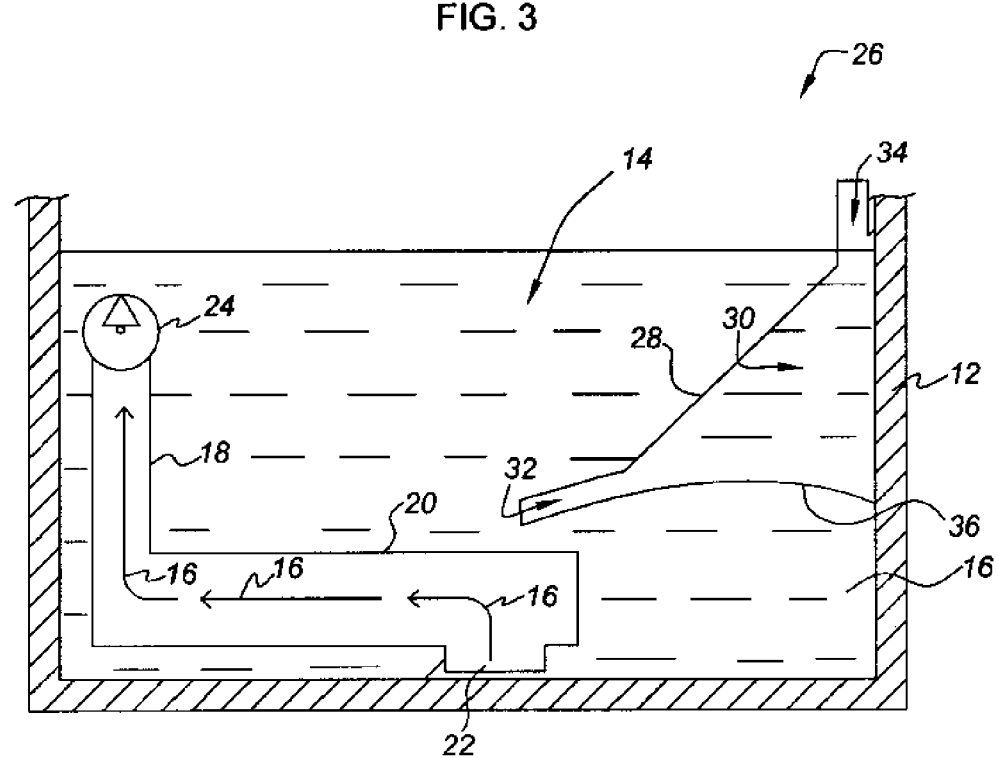
FIG. 4 is a schematic side view of the portion of the vehicular transmission of FIG. 3 illustrating the sump and fluid displacement reservoir depicting a warm mode of transmission operation.

FIG. 4 illustrates the transmission 26 of FIG. 2 during warn operation and subject to zero acceleration. As is generally known to those skilled in the art of transmission design, the volume of fluid 16 contained within the sump volume 14 tends increase during warm operation of the transmission 26. This is mainly due to the fact that the fluid 16 tends to expand as it warms and there is less "in transits" fluid volume. Additionally, an amount of air may be entrained within the fluid 16 further increasing the volume of fluid 16 within the sump volume 14. Advantageously, the sump volume 14 is not affected by the inclusion of the fluid displacement reservoir 28 during warm transmission operation. As the amount of fluid 16 increases within the sump volume 14 due to the warming of the fluid 16, the fluid 16 will enter the reservoir volume 30 through the orifice 32. Any gas present within the reservoir volume 30 will be forced through the vent orifice 34 as the fluid 16 enters the reservoir volume 30, thereby facilitating the filling of the fluid displacement reservoir 28 with fluid 16.

Figure 5:
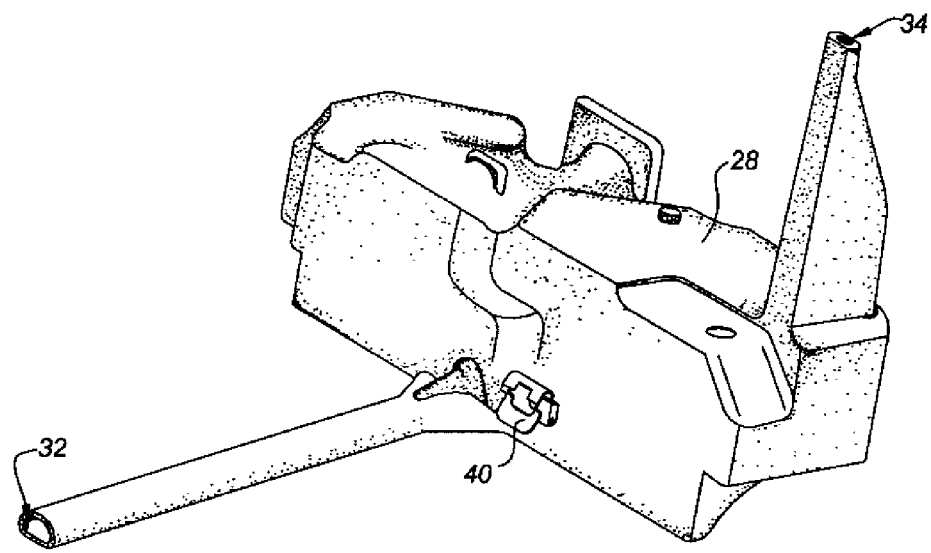
FIG. 5 is a perspective view of the fluid displacement reservoir schematically depicted in FIGS. 3 and 4.

Referring now to FIG. 5, there is shown a perspective view of the fluid displacement reservoir 28 of the present invention. The fluid displacement reservoir 28 is preferably formed from molded plastic having the requisite heat and chemical resistance to operate reliably within the transmission 26. A snap-fit mounting feature 40 is provided to facilitate the assembly of the fluid displacement reservoir 28 within the transmission 26.

Figure 6:
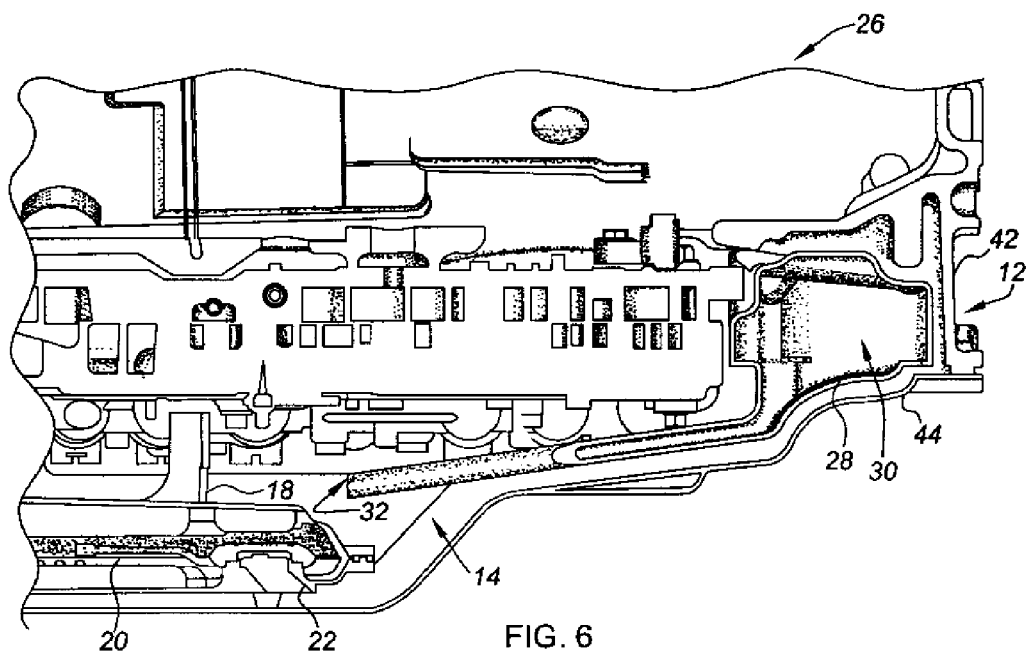
FIG. 6 is a cross sectional side view of the transmission, schematically depicted in FIGS. 3 and 4, illustrating the fluid displacement reservoir of FIG. 5 disposed within the vehicular transmission.

FIG. 6 is a cross sectional view of a portion of the transmission 26. The sump 12 includes a transmission case 42 and a pan 44. The transmission case 42 and pan 44 cooperate to at least partially define the sump volume 14. Additionally, the placement of the orifice 32 substantially adjacent to the inlet portion 22 of the inlet tube 18 is illustrated in FIG. 6.

The fluid displacement reservoir 28 of the present invention allows the sump volume 14 to be maximized, while decreasing the packaging space required by the sump 12 and decreasing the maneuver volume required when the transmission 26 is operating with cool fluid 16. Although the discussion hereinabove has focused mainly on the application of the fluid displacement reservoir 28 within the transmission 26, those skilled in the art will recognize that the fluid displacement reservoir 28 may be used within internal combustion engines or other devices containing fluid and subject to acceleration.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   a sump at least partially defining a sump volume operable to contain a fluid;
   a hydraulic pump;
   an inlet tube disposed at least partially within said fluid directly within the sump, said inlet tube being operable to communicate said fluid from said sump volume to said hydraulic pump; and
   a fluid displacement reservoir defining a reservoir volume and disposed at least partially within said sump volume and operable to selectively impede the movement of at least a portion of said fluid when a predetermined amount of said fluid within the transmission is subject to acceleration, such that the amount of said fluid required within the sump volume to maintain said inlet tube disposed within said fluid is reduced;
   wherein said fluid displacement reservoir is operable to selectively receive at least a portion of said fluid; and
   wherein said fluid displacement reservoir defines a port positioned to allow said fluid to flow between said sump volume and said reservoir volume, and the port is sufficiently positioned to prevent said fluid from entering said reservoir volume of said fluid displacement reservoir when the amount of said fluid contained within said sump is less than said predetermined amount but is sufficient to maintain said inlet tube disposed within said fluid directly within the sump.

2. The transmission of claim 1, wherein said port is disposed substantially adjacent to said inlet tube.

3. The transmission of claim 1, wherein said fluid displacement reservoir defines a vent port operable to facilitate flow of said fluid through said port.

4. The transmission of claim 1, wherein at least a portion of said fluid displacement reservoir is contoured to direct said fluid toward said inlet tube when said fluid is subject to acceleration.

5. An automatically shiftable vehicular transmission comprising:
- a sump at least partially defining a sump volume operable to contain a fluid;
- a hydraulic pump;
- an inlet tube disposed at least partially within said fluid directly within the sump and operable to communicate said fluid from said sump volume to said hydraulic pump; and
- a fluid displacement reservoir defining a reservoir volume and disposed at least partially within said sump volume and operable to impede the movement of at least a portion of said fluid when said fluid within the transmission is cool and subject to acceleration, such that the amount of said fluid required within the sump volume to maintain said inlet tube at least partially disposed within said fluid is reduced;
- wherein said fluid displacement reservoir is configured to receive at least a portion of said fluid when said fluid within said sump volume is warm;
- wherein said fluid displacement reservoir defines a first port positioned substantially adjacent to said inlet tube and sufficiently configured to allow said fluid to flow into said reservoir volume when said fluid is warm, and the first port is sufficiently positioned to prevent said fluid from entering said reservoir volume of said fluid displacement reservoir when the amount of said fluid contained within said sump is less than said predetermined amount but is sufficient to maintain said inlet tube disposed within said fluid directly within the sump; and
- wherein said fluid displacement reservoir defines a second port operable to facilitate flow of said fluid through said first port.

6. The automatically shiftable vehicular transmission of claim 5, wherein at least a portion of said fluid displacement reservoir is contoured to direct said fluid toward said inlet tube when said fluid is subject to acceleration.

7. The automatically shiftable vehicular transmission of claim 5, wherein the fluid displacement reservoir is formed from one of metal and plastic.

* * * * *